ent Office 3,105,070
Patented Sept. 24, 1963

3,105,070
PHTHALOCYANINE DYESTUFFS CONTAINING HALO-PYRIMIDYL GROUPS
Peter Bitterli, Basel, Switzerland, assignor to Sandoz Ltd., Basel, Switzerland, a Swiss firm
No Drawing. Filed Mar. 26, 1962, Ser. No. 182,610
Claims priority, application Switzerland Apr. 12, 1960
7 Claims. (Cl. 260—242)

This application is a continuation-in-part of application Ser. No. 100,002, filed April 3, 1961 (abandoned since the filing of the present application), and relates to dyes of the phthalocyanine series which contain reactive groups and have the formula

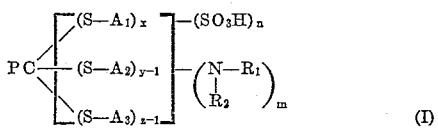

wherein

PC represents a metal-free or metal-containing phthalocyanine radical which may be further substituted by one or two chlorine or bromine atoms, $A_1$ represents a low molecular alkylene radical which may be further substituted, each of $A_2$ and $A_3$ represents a phenylene or low molecular alkylene radical which may be further substituted, $A_2$ and $A_3$ being different from each other, $R_1$ represents a di- or trihalogenopyrimidyl radical wherein Hal stands for chlorine or bromine, $R_2$ represents hydrogen or a low molecular alkyl radical, $n$ possesses a value of at least 2 but not more than 4, in the absence of phenylene radicals and at least 3 but not more than 4 in the presence of a phenylene radical, and $m$, $x$, $y$ and $z$ each possesses a value of at least 1 but not more than 4, the total $x+y+z$ being 6 and the —$SO_3H$ and

groups being attached to the radicals $A_1$, $A_2$ and $A_3$.

Particularly interesting dyes are those in which PC represents an unsubstituted metal-free phthalocyanine radical or an unsubstituted copper or nickel phthalocyanine radical or a copper phthalocyanine radical bearing one or two chlorine or bromine atoms.

The process for the production of the new dyes consists in reducing the sulfonic acid halide groups in phthalocyanine-tetrasulfonic acid halides of the formula $$PC(SO_2Hal)_4 \quad (II)$$

wherein PC and Hal possess the aforecited meanings, and reacting the resulting polythiol with one or more alkylating agents or a mixture of phenylating and alkylating agents which contain sulfonic acid groups and/or —NH—$R_2$ groups or D substituents convertible into these groups and further substituents if desired, so that the alkylthioethers or the phenyl- and alkylthioethers obtained possess at least $m$ —NH—$R_2$ or D groups and at least two sulfonic acid groups, converting the D substituents when present into the —NH—$R_2$-group or groups, and condensing 1 mole of the amino dyestuff or the mixture of amino dyestuffs with $m$ moles of a tri- or tetrahalogenopyrimidine, wherein Hal stands for chlorine or bromine.

The phthalocyanine-tetrasulfonic acid halies of Formula II are reduced to the corresponding thiol compounds preferably in acid medium, e.g., in hydrochloric and/or sulfuric acid-aqueous medium, in presence of iron or zinc. The thiol compounds thus formed are reacted with the alkylating agents or mixtures of phenylating and alkylating agents preferably in aqueous alkaline medium at pH value of 8–14 and at temperatures between 20–100° C., preferably 60–90° C., with the addition of an acid-binding agent, e.g. sodium hydroxide, carbonate or bicarbonate, or the corresponding potassium salts.

If the phenylating and/or alkylating agents contain D substituents convertible into the group —NH—$R_2$, e.g. one to two nitro groups in the phenylating agents or a group acyl-N—$R_2$, at least one nitro group is to be reduced, e.g. by heating with an aqueous solution of sodium sulfide or sodium hydrogen sulfide, preferably at temperatures of 60 to 90° C. or with iron powder or filings in a dilute mineral acid, preferably in 5 to 10% hydrochloric or sulfuric acid, at 0° to 100° C., preferably at 20–80° C., or with a mixture of stannous chloride and concentrated hydrochloric acid, e.g. at 50–100° C., or the group acyl-N—$R_2$ is to be hydrolyzed, e.g. by heating in an aqueous alkali metal hydroxide solution, preferably in 5 to 10% sodium or potassium hydroxide solution, at 70 to 100° C. or in a dilute mineral acid, preferably in 5 to 10% hydrochloric or sulfuric acid at 70° to 100° C.

Examples of suitable phthalocyanines are the metal-free phthalocyanine, copper and nickel phthalocyanines, mono- or dichloro- or mono- or dibromo-copper phthalocyanines.

The following are examples of phenylating or alkylating agents suitable for reaction with the thiol: 1-chloro-4-nitrobenzene, 1-chloro-2-nitrobenzene-4-sulfonic acid, 1-chloro-4-nitrobenzene-2-sulfonic acid, 1,2-dichloro-4-nitrobenzene-6-sulfonic acid, 1-chloro-2,4-dinitrobenzene-6-sulfonic acid, β-chloroethanesulfonic acid, the inner anhydride of β-sulfonyl-oxyethanesulfonic acid ("carbyl sulfate"), β-[(4-methyl)-phenylsulfonyloxy]-ethanesulfonic acid, 3-chloro-2-hydroxy-propane-1-sulfonic acid, 4-methylsulfonyloxybutane-1-sulfonic acid, 2-chloroethylamine, acetic acid —N-(2-chloro)-ethylamide, N-(2-chloroethyl)-N-methylamine, the sulfuric acid esters of β-aminoethanol, 1-amino-2-propanol or 1-amino-3-butanol, 2-(2'-chloro-ethylamino)-ethane-1-sulfonic acid, 3-(2'-chloroethylamino)-2-hydroxypropane-1-sulfonic acid.

Tri- and tetrahalogenopyrimidines which may be condensed with the —NH—R group or groups are e.g.: 2,4,6-trichloropyrimidine and 2,4,6-tribromopyrimidine, and their derivatives which may contain, for example, the following substituents in the 5-position: methyl, ethyl, carboxylic acid, carboxylic acid methyl or ethyl ester, alkenyl, e.g. allyl, chlorovinyl, substituted alkyl, e.g. carboxymethyl, chloromethyl or bromomethyl, 2,4,5,6-tetrachloro- or -tetrabromopyrimidine, 2,4,5-trichloropyrimidine, 2,4,5-tribromopyrimidine, 2,5,6-trichloro-4-methylpyrimidine, 2,5,6-tribromo-4-methylpyrimidine, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo-5-bromomethylpyrimidine and 2,6-dichloro-4-trichloromethylpyrimidine.

The reaction is carried out preferably at temperatures of 40° to 100° C. in a weakly alkaline, neutral to weakly acid medium, but preferably within the pH range of 9 to 3. To neutralize the hydrogen halide formed, an acid-binding agent, e.g. sodium acetate, is added to the solution at the start of the reaction, or small portions of sodium or potassium carbonate or bicarbonate in solid powder form or in concentrated aqueous solution are added during the course of the reaction. Aqueous solutions of sodium or potassium hydroxide are also suitable as neutralizing agents. The addition of small amounts of a wetting or emulsifying agent to the reaction mixture can accelerate the rate of reaction.

Owing to the volatility in steam of certain halogenopyrimidines it is advisable to work in vessels fitted with reflux condensers. The reaction is so conducted that only one halogen atom reacts with an exchangeable hydrogen atom.

The condensation products are isolated from their aqueous or aqueous-organic solutions by evaporation or by salting out or acidification. They are then filtered off, washed, neutralized in paste form if desired, and finally dried.

The new dyestuffs are suitable for the dyeing of leather; for the dyeing, padding and printing of fibers of animal origin, e.g. wool, silk; synthetic polyamide fibers, e.g. nylon, "Perlon" (registered trademark); and in particular cellulosic fibers, e.g. cotton, linen, viscose rayon, viscose staple fiber and cuprammonium rayon; and also mixtures and other articles of these fibers.

The new dyestuffs possess good solubility in water, good compatibility to salts and hard water and good reactivity with vegetable fibers. In contrast to the corresponding tetra-(arylthio)-phthalocyanines they yield printing pastes and padding liquors stable to storage. They are insensitive to heavy metal ions such as copper, iron and chromium ions.

During or after dyeing or padding, or after printing on cellulosic fibers as the case may be, the goods are submitted to heat treatments. The normally used wetting, levelling, thickening and other textile or leather auxiliary products can be used in dyeing, padding and printing with these dyestuffs. The heat treatment is carried out in presence of alkali.

The addition of certain quaternizable amines such as trimethylamine, triethylenediamine or of asymmetric dimethylhydrazine, preferably in stoichiometric amounts, accelerates the fixation of the dyestuff on the fiber, so that the fixation temperature can be lowered and/or the fixation time shortened.

Owing to the rather slight substantivity of the new dyestuffs, the unfixed dyestuff portion can easily be removed from the dyeings and prints on cellulosic fibers without staining the unprinted areas.

The green dyeings and prints obtained possess very good wet fastness properties to perspiration, water and sea water combined with good to very good fastness to light, alkali, organic acids, rubbing and dry cleaning. They are stable to organic solvents. The dyestuffs of the invention reserve cellulose acetate and triacetate, polyacrylonitrile fibers, polyvinyl chloride and polyvinyl acetate fibers, linear aromatic polyester fibers and polyalkylene fibers.

In the following examples the parts and percentages are by weight and the temperatures in degrees centigrade.

*Example 1*

58 parts of copper phthalocyanine are tetrasulfochlorinated with 260 parts of chlorosulfonic acid in the known manner, and the reaction mass discharged into a mixture of 1200 parts of ice and 230 parts of concentrated hydrochloric acid. To the suspension formed is gradually added, in a nitrogen atmosphere, 120 parts of iron filings, the temperature being meanwhile maintained at 20–25° by external cooling. Stirring in presence of nitrogen is continued for 16 hours at 20° and then for 2 hours at 80°. The precipitated tetra-(3)-mercaptophthalocyanine is filtered off with suction and washed with warm water until it is free of iron salts and of neutral reaction. The moist thiol is suspended in 1200 parts of water in presence of nitrogen. After the addition of 68 parts of 30% sodium hydroxide solution, 40 parts of sodium 3-chloro-2-hydroxypropane-1-sulfonate and 55 parts of sodium 1-chloro-4-nitrobenzene-2-sulfonate the reaction mass is stirred at 90° for 16 hours and nitrogen conducted through it during this time. The deep green solution is freed from undissolved matter by filtration.

Reduction is effected by adding 45 parts of 60% sodium sulfide to the filtrate and stirring for 1 hour at 80°, upon which concentrated hydrochloric acid is added until the solution reacts acid to Congo red indicator paper. The precipitated dye is filtered off and washed with 200 parts of 1% hydrochloric acid. The filtercake is stirred into 800 parts of water, brought into solution by the addition of sodium hydroxide solution at a pH value of 7–8, and freed from precipitated sulfur by filtration. The solution is heated to 70–80° and 22 parts of 2,4,5,6-tetrachloropyrimidine are added in portions; simultaneously sufficient sodium hydroxide solution is dropped in to maintain a constant pH of 6–7. When the reaction has run its course the dye is precipitated by acidification and salting out, filtered with suction, washed neutral with 5% sodium chloride solution and dried in vacuum at 50°. The dye obtained dissolves in concentrated sulfuric acid to give gray-green solution and in water bright green solutions.

Unmercerized cotton fabric is printed with a printing paste of the following composition:

30 parts of the dye produced as described above
100 parts of urea
395 parts of water
450 parts of a 3% sodium alginate thickening
10 parts of sodium 1-nitrobenzene-3-sulfonate
15 parts of anhydrous sodium carbonate 1000 parts The printed fabric is dried, steamed for 10 minutes at 102–104°, rinsed in cold and warm water, soaped at the boil, rinsed and dried. A bright green print of good light and wet fastness is obtained.

When the sodium 3-chloro-2-hydroxypropane-1-sulfonate employed in Example 1 is replaced by 34 parts of sodium 2-chloroethanesulfonate, a dye with similar properties is obtained. Analogously, sodium 1-chloro-4-nitrobenzene-2-sulfonate can be replaced by the same amount of sodium 1-chloro-2-nitrobenzene-4-sulfonate or by 57 parts of sodium 1,2-dichloro-4-nitrobenzene-6-sulfonate to give a dye slightly more yellowish in shade.

When the tetra-3-mercapto-copper phthalocyanine is replaced by the same amount of tetra-3-mercapto-nickel phthalocyanine (obtained from nickel phthalocyanine by sulfochlorination and reduction of the sulfonic acid chloride with iron and hydrochloric acid), a brilliant green dye with good wet fastness properties is obtained.

*Example 2*

The dye produced with tetra-3-mercapto-copper phthalocyanine (from 58 parts of copper phthalocyanine), 40 parts of sodium 3-chloro-2-hydroxypropane-1-sulfonate and 71 parts of sodium 1,2-dichloro-4-nitrobenzene-6-sulfonate by condensation and reduction according to the particulars of Example 1 is dissolved in 800 parts of water at 80–90° and reacted with 18.5 parts of 2,4,6-trichloropyrimidine. The liberated hydrochloric acid is neutralized by the gradual addition of about 40 parts of 10% sodium hydroxide solution, which maintains the pH value of the solution at 6–7. The product is a dye having similar properties to that of Example 1 but giving a more yellowish green shade.

A padding solution is prepared with 10 parts of the above dye in 1000 parts of water and 10 parts of sodium carbonate. A cotton fabric is impregnated with this solution, passed between squeeze rollers so that it contains about 70% of its dry weight of liquor, and dried. The padded good is treated in dry heat for about 5 minutes at 150°, rinsed with cold and warm water, soaped at the boil for 15 minutes with a 0.05–0.1% solution of a non-ionic detergent and rinsed. A green dyeing is obtained, which is fast to washing, perspiration, water, sea water, soda boiling, pressing, rubbing and dry cleaning.

*Example 3*

A solution is prepared with tetra-3-mercaptocopper phthalocyanine, produced from 58 parts of copper phthalocyanine by the procedure described in Example 1,600 parts of water and 75 parts of 30% sodium hydroxide solution. At 60° 40 parts of sodium 3-chloro-2-hydroxy-propane-1-sulfonate are added in a nitrogen atmosphere. After stirring for 3 hours at 60°, 28 parts of 30% sodium hydroxide solution and 24 parts of 2-chloro-ethylamine chlorohydrate are added and stirring continued for 16 hours at 60°. The undissolved components are removed by filtration and the dye precipitated by adding to the warm solution 450 parts of 30% hydrochloric acid and cooling to 20°. It is filtered off and washed with 1000 parts of 1% hydrochloric acid.

The intermediate product is dissolved in 800 parts of water and reacted with 22 parts of 2,4,5,6-tetrachloropyrimidine at 80° at a pH value of 6-7. The dye is isolated by evaporating the solution. When 2-chloroethylamine chlorohydrate is replaced by 26 parts of N-methyl-N-2-chloroethylamine chlorohydrate, a green dye with similar properties is obtained.

*Example 4*

20 parts of the dye (in the form of the sodium salt) obtained by the procedure of Example 1 from tetra-4-mercapto-copper phthalocyanine, sodium 3-chloro-2-hydroxypropane-1-sulfonate and sodium 1-chloro-4-nitrobenzene-2-sulfonate by condensation and reduction, are dissolved in 300 parts of cold water. The solution is reacted with 3.4 parts of 2,4,5,6-tetrachloropyrimidine, the reaction temperature being maintained at 75-80° and the pH value of the solution at about 7 by the gradual addition of dilute sodium hydroxide solution. On completion of the reaction any remaining unreacted 2,4,5,6-tetrachloropyrimidine is filtered off, and the dye salted out of the filtrate, filtered with suction and dried at 50° with vacuum.

The tetra-4-mercaptocopper phthalocyanine is obtained from copper phthalocyanine tetra-4-sulfonic acid by conversion into the sulfonic acid chloride and subsequent reduction with iron and hydrochloric acid according to the details given in Example 1.

*Example 5*

A solution of 20 parts of the dye (in the form of the sodium salt) obtained according to Example 1 from tetra-3-mercaptocopper phthalocyanine, sodium 3-chloro-2-hydroxypropane -1-sulfonate and sodium 1-chloro-4-nitrobenzene-2-sulfonate by condensation and reduction, are reacted with 3.6 parts of 2,4-dichloro-5-chloromethyl-6-methylpyrimidine in 300 parts of water 75-80°, the pH value being maintained at about 6-7 by the addition of sodium hydroxide solution. On completion of the reaction the dye is precipitated by acidification and salting out, filtered off, washed with a sodium chloride solution and dried at 50° with vacuum.

In the following table are listed further dyes of the Formula I which are obtainable according to the particulars of Examples 1 to 5 and are characterized by the tetramercaptophthalocyanine (obtained by reduction of the corresponding phthalocyanine-tetrasulfonic acid halide) in column I, the phenylating agent or agents and its or their amount in columns II and III, the alkylating agent or agents and its or their amount in columns IV and V, the polyhalogenopyrimidine and its amount in columns VI and VII and the shade of the dyeing on cotton on column VIII.

The amounts in moles mentioned in columns III, V and VII refer to the one mole of tetramercapto-phthalocyanine.

| Ex. No. | Polymercapto-phthalocyanine (I) | Phenylating agent(s) (II) | Moles (III) | Alkylating agent(s) (IV) | Moles (V) | Reactive system (VI) | Moles (VII) | Shade of pad dyeing on cotton (VIII) |
|---|---|---|---|---|---|---|---|---|
| 6 | Tetra-3-mercapto copper phthalocyanine. | 1-chloro-4-nitrobenzene. | 1 | 2-chloro-ethane-1-sulfonic acid. | 2 | 2,4,5,6-tetra-chloro-pyrimidine | 1 | Green. |
|  |  | 1-chloro-4-nitrobenzine-6-sulfonic acid. | 1 |  |  |  |  |  |
| 7[1] | ___do___ | 1-chloro-2,4-dinitrobenzene-6-sulfonic acid. | 2 | ___do___ | 2 | ___do___ | 1 | Do. |
| 8[1] | ___do___ | ___do___ | 1 | 4-methyl-sulfonyl-oxybutane-1-sulfonic acid. | 3 | 2,4,6-trichloro-pyrimidine. | 1 | Do. |
| 9 | ___do___ | 1-chloro-4-nitrobenzene. | 1 | Carbyl sulfate | 3 | 2,4-dichloro-5-chloromethyl-6-methyl-pyrimidine. | 1 | Do. |
| 10 | ___do___ | 1-chloro-4-nitrobenzene-2-sulfonic acid. | 2 | 2-[(4'-methyl)-phenyl-sulfonyloxy]-ethane-1-sulfonic acid. | 2 | ___do___ | 2 | Do. |
| 11 | ___do___ | ___do___ | 1 | 3-chloro-2-hydroxypropane-1-sulfonic acid. | 3 | 2,4,6-tribromo-pyrimidine. | 1 | Do. |
| 12 | ___do___ | ___do___ | 2 | ___do___ | 2 | 2,4,5-trichloro-pyrimidine. | 1 | Do. |
| 13 | ___do___ | ___do___ | 2 | ___do___ | 2 | 2,4,6-trichloro-5-methylpyrimidine. | 1 | Do. |
| 14 | ___do___ | ___do___ | 2 | ___do___ | 2 | 2,4,6-trichloro-5-carboxymethyl-pyrimidine. | 1 | Do. |
| 15 | ___do___ | ___do___ | 2 | ___do___ | 2 | 2,4-dibromo-5-bromomethyl-6-methyl-pyrimidine. | 1 | Do. |
| 16 | ___do___ | ___do___ | 2 | ___do___ | 2 | 2,4,5,6-tetra-bromo-pyrimidine. | 1 | Do. |
| 17 | Tetra-4-mercapto copper phthalocyanine. | ___do___ | 1 | 2-chloropropane-1-sulfonic acid. | 3 | 2,4,5,6-tetra-chloro-pyrimidine. | 1 | Do. |
| 18 | ___do___ | 1-chloro-2-nitrobenzene-4-sulfonic acid. | 2 | ___do___ | 2 | ___do___ | 1 | Do. |
| 19 | Tetra-3-mercapto nickel phthalocyanine. | 1-chloro-4-nitrobenzene-2-sulfonic acid. | 1 | ___do___ | 3 | 2,4,6-trichloro-5-ethylpyrimidine. | 1 | Bluish-green. |
| 20 | ___do___ |  |  | Acetic acid (2-chloro)-ethylamide. | 2 | 2,4,6-trichloro-pyrimidine. | 2 | Green. |
|  |  |  |  | 2-chloroethane-1-sulfonic acid. | 2 |  |  |  |
| 21 | ___do___ |  |  | 2-aminoethyl-sulfuric acid. | 2 | 2,4,5,6-tetrachloro-pyrimidine. | 1 |  |
|  |  |  |  | 2-(2'-chloro-ethylamino)-ethane-1-sulfonic acid. | 2 |  |  |  |
| 22 | ___do___ |  |  | 1-aminopropyl-2-sul sulfuric acid. | 2 | ___do___ | 1 | Green-blue. |
|  |  |  |  | 2-bromoethane-1-sulfonic acid. | 2 |  |  |  |
| 23 | ___do___ | 1-chloro-4-nitrobenzene-2-sulfonic acid. | 1.5 | 3-(2'-chloroethylamino)-2 hydroxy-propane-1-sulfonic acid. | 2.5 | ___do___ | 1.5 | Do. |
| 24 | ___do___ | ___do___ | 2 | ___do___ | 2 | 2,4,6-tribromo-5-carboxypyrimidine. | 1 | Do. |

See footnotes at end of table.

| Ex. No. | Polymercapto-phthalocyanine (I) | Phenylating agent(s) (II) | Moles (III) | Alkylating agent(s) (IV) | Moles (V) | Reactive system (VI) | Moles (VII) | Shade of pad dyeing on cotton (VIII) |
|---|---|---|---|---|---|---|---|---|
| 25 | Tetra-3-mercapto copper phthalocyanine. | 1-chloro-4-nitrobenzene-2-sulfonic acid. | 2 | 3-chloro-2-hydroxy-propane-1-sulfonic acid. | 2 | 2,4,5,6-tetrabromopyrimidine. | 1 | Green. |
| 26 | ---do--- | 1,2-dichloro-4-nitrobenzene-6-sulfonic acid. | 1.5 | ---do--- | 2.5 | 2,4,6-trichloro-5-carboxmethylpyrimidine. | 1.5 | Do. |
| 27 | ---do--- | ---do--- | 2 | 2-chloroethane-1-sulfonic acid. | 2 | 2,4-dibromo-5-bromomethyl-6-methylpyrimidine. | 1 | Do. |
| 28 | ---do--- | ---do--- | 2 | ---do--- | 2 | 2,4,6-trichloro-5-carboxypyrimidine. | 2 | Blue-green. |
| 29 | ---do--- | ---do--- | 2 | 3-chloro-2-hydroxy-propane-1-sulfonic acid. / 2-(2'-chloroethylamino)-ethane-1-sulfonic acid. | 2 / 1 | 2,4,6-trichloropyrimidine | 1 | Do. |
| 30 | ---do--- | 1-chloro-4-nitrobenzene-2-sulfonic acid. | 2 | 3-chloro-2-hydroxypropane-1-sulfonic acid. | 2 | 2,4,6-tribromo-5-ethylpyrimidine. | 1 | Green. |
| 31 | ---do--- | ---do--- | 2 | ---do--- | 2 | 2,4,6-tribromo-5-bromomethylpyrimidine. | 1 | Do. |
| 32 | ---do--- | ---do--- | 2 | 2-chloro-ethane-1-sulfonic acid. | 2 | 2,4-dichloro-5-chloromethyl-6-methylpyrimidine. | 1 | Do. |
| 33 | ---do--- | ---do--- | 2 | ---do--- | 2 | 2,4,6-trichloro-5-chlorovinylpyrimidine. | 1 | Do. |
| 34 | Mono-3-chlorotetra-3/6-mercapto copper phthalocyanine. | ---do--- | 2 | ---do--- | 2 | 2,4,6-trichloropyrimidine. | 1 | Do. |
| 35 | Di-3-chlorotetra-3/6-mercapto copper phthalocyanine. | ---do--- | 1 | ---do--- | 3 | 2,4,5,6-tetrachloropyrimidine. | 1 | Do. |
| 36 | Tetra-3-mercapto copper phthalocyanine. | 1,2-dichloro-4-nitrobenzene-6-sulfonic acid. | 1.5 | ---do--- | 2.5 | 2,4,5-trichloropyrimidine. | 1.5 | Do. |
| 37 | Tetra-4-mercapto copper phthalocyanine. | ---do--- | 1 | ---do--- | 3 | 2,4-dichloro-5-chloromethylpyrimidine. | 1 | Do. |
| 38 | Di-3-bromo-tetra-3/6-mercapto copper | | | 2-chloro-ethyl-amine. / 2-chloro-ethane-1-sulfonic acid. | 1 / 3 | 2,4,5,6-tetra-chloro-pyrimidine. | 1 | Do. |
| 39 | Mono-3-bromo-tetra-3/6-mercapto copper phthalocyanine. | | | 2-(2'-chloro-ethyl-amino)-ethane-1-sulfonic acid. / 3-chloro-2-hydroxy-propane-1-sulfonic acid. | 1 / 3 | do | 1 | Do. |
| 40 | ---do--- | 1-chloro-4-nitrobenezene-2-sulfonic acid. | 1 | 3-chloro-2-hydroxy-propane-1-sulfonic acid. | 3 | 2,4,6-trichloropyrimidine. | 1 | Do. |
| 41 | Tetra-3-mercapto copper phthalocyanine. | ---do--- | 1 | ---do--- | 3 | 2,4,6-tribromo-6-carboethoxypyrimidine. | 1 | Do. |
| 42 | ---do--- | ---do--- | 1.5 | ---do--- | 2.5 | 2,4,5,6-tetrachloro-pyrimidine. | 1.5 | Do. |
| 43 | ---do--- | ---do--- | 3 | ---do--- | 1 | ---do--- | 3 | Do. |
| 44 | ---do--- | 1-chloro-4-nitrobenzene. | 1 | ---do--- | 3 | ---do--- | 1 | Do. |
| 45 | ---do--- | | | N-(2-chloroethyl)-N-methylamine. / 2-chloroethane-1-sulfonic acid. | 2 / 2 | 2,4,6-trichloropyrimidine. | 2 | Do. |
| 46 | ---do--- | 1-chloro-4-nitrobenzene-2-sulfonic acid. | 2 | 2-aminoethyl-sulfuric acid. / 2-chloroethane-1-sulfonic acid. | 1 / 1 | ---do--- | 2.5 | Do. |
| 47 | ---do--- | 1-bromo-4-nitrobenzene-2-sulfonic acid. | 2 | 3-chloro-2-hydroxy-propane-1-sulfonic acid. | 2 | 2,4,6-trichloro-5-carboxymethylpyrimidine. | 1.2 | Do. |
| 48 | ---do--- | ---do--- | 2 | ---do--- | 2 | 2,5,6-trichloro-4-methylpyrimidine. | 1.4 | Do. |
| 49 | Tetra-4-mercapto copper phthalocyanine. | 1-chloro-4-nitrobenzene-2-sulfonic acid. | 1 | 2-chloro-ethane-1-sulfonic acid. | 3 | 2,4,6-tribromo-5-allylpyrimidine. | 1 | Do. |
| 50 | ---do--- | 1,2-dichloro-4-nitrobenzene-6-sulfonic acid. | 1 | ---do--- | 3 | 2,4,6-trichloro-5-carbomethoxypyrimidine. | 1 | Do. |
| 51 | Tetra-3-mercapto copper phthalocyanine. | ---do--- | 1 | ---do--- | 3 | 2,4,6-tribromo-5-bromovinylpyrimidine. | 1 | Do. |
| 52 | ---do--- | | | N-(2-chloroethyl)N-ethylamine. / 3-bromo-2-hydroxy-propane-1-sulfonic acid. | 1.5 / 2.5 | 2,4-dibromo-5-bromomethylpyrimidine. | 1.5 | Do. |
| 53 | ---do--- | | | 2-(methylamino)-ethyl-1-sulfonic acid. / 2-chloroethane-1-sulfonic acid. | 1.3 / 2.7 | 2,4-dichloro-5-chloromethyl-6-methylpyrimidine. | 1.3 | Do. |
| 54 [2] | ---do--- | 1-chloro-2,4-di-nitrobenzene-6-sulfonic acid. | 1 | 3-chloro-2-hydroxy-propane-1-sulfonic acid. | 3 | ---do--- | 1 | Do. |
| 55 [3] | ---do--- | ---do--- | 1 | ---do--- | 3 | 2,4,6-trichloro-5-chloromethylpyrimidine. | 1 | Do. |
| 56 | ---do--- | 1-chloro-4-nitrobenzene-2-sulfonic acid. | 1 | ---do--- | 3 | 2,4,6-trichloro-5-carboethoxypyrimidine. | 1 / 1 | Do. Do. |
| 57 | ---do--- | ---do--- | 1 | ---do--- | 3 | 2,4,6-tirbromo-5-methylpyrimidine. | 1 | Do. |
| 58 | Tetra-3-mercapto phthalocyanine. | ---do--- | 2 | 2-chloroethane-1-sulfonic acid. | 2 | 2,4,5,6-tetrachloropyrimidine. | 1.2 | Do. |
| 59 | ---do--- | ---do--- | 1.5 | ---do--- | 2.5 | 2,4,6-tribromo-4-carboxymethylpyrimidine. | 1.5 | Do. |

See footnotes at end of table.

| Ex. No. | Polymercapto-phthalocyanine (I) | Phenylating agent(s) (II) | Moles (III) | Alkylating agent(s) (IV) | Moles (V) | Reactive system (VI) | Moles (VII) | Shade of pad dyeing on cotton (VIII) |
|---|---|---|---|---|---|---|---|---|
| 60 | Tetra-3-mercapto phthalocyanine. | | | 2-chloroethane-1-sulfonic acid. 2-chloro-ethylamine. | 2 | 2,4,6-trichloropyrimidine. | 1 | Green. |
| 61 | ___do___ | 1,2-dichloro-4-nitro-benzene-6-sulfonic acid. | 2 | 3-chloro-2-hydroxypropane-1-sulfonic acid. | 2 2 | ___do___ | 2 | Do. |
| 62 | Tetra-3-mercapto copper phthalocyanine. | ___do___ | 2 | ___do___ | 2 | 2,4,5-tribromopyrimidine. | 1 | Do. |
| 63 | ___do___ | 1-chloro-4-nitro-benzene-2-sulfonic acid. | 2 | ___do___ | 2 | 2,4,6-trichloro-5-allyl-pyrimidine. | 1 | Do. |
| 64 | Tetra-4-mercapto copper phthalocyanine. | ___do___ | 2 | ___do___ | 2 | 2,4,6-tribromo-5-carboethoxy-pyrimidine. | 1 | Do. |
| 65[4] | ___do___ | ___do___ | 1 | 2-chloroethylamine. 2-chloro-ethane-1-sulfonic acid. | 1 2 | 2,4,6-trichloro-pyrimidine. | 1 | Do. |
| 66 | ___do___ | ___do___ | 2 | 2-chloro-ethane-1-sulfonic acid | 2 | 2,5,6-tribromo-4-methylpyrimidine | 1 | Do. |
| 67 | ___do___ | | | 1-aminobutyl-3-sulfuric acid. 2-chloroethane-1-sulfonic acid. | 1.2 2.8 | 2,4,6-trichloro-pyrimidine. | 1.2 | Do. |

[1] In Examples 7 and 8 the two nitro groups of the phenylating agent are reduced to amino groups after the formation of the phenyl and of the alkyl thioether; one amino group is then reacted with the reactive system, whereas the three other remain free.
[2] In Example 54 after the phenylation and alkylation of the thiol groups one of the two nitro groups of the phenylating agent is reduced to an amino group which is reacted with the 2,4-dichloro-5-chloromethyl-6-methylpyrimidine, whereas the other nitro group remains free.
[3] In Example 55 the two nitro groups of the phenylating agent are reduced to amino groups after the formation of the phenyl and of the Alkyl thioether; one amino group is reacted with the 2,4,6-trichloromethyl-5-chloromethylpyrimidine and the other remains free.
[4] In Example 65 the nitro group of the phenylating agent is not reduced.

Formulae of representative dyes of the foregoing examples are as follows.
Example 1:

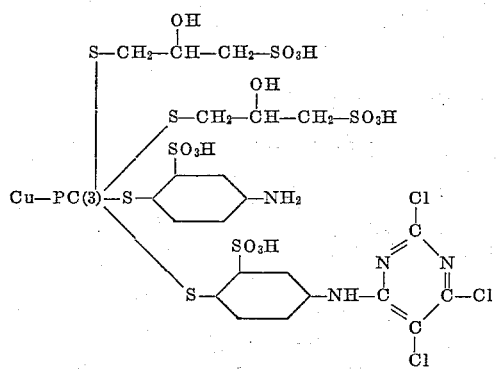

Cu—PC represents the copper phthalocyanine radical; (3) denotes that the four —S— are bound to the copper phthalocyanine radical in the four 3-positions.
Example 1 (penultimate paragraph):

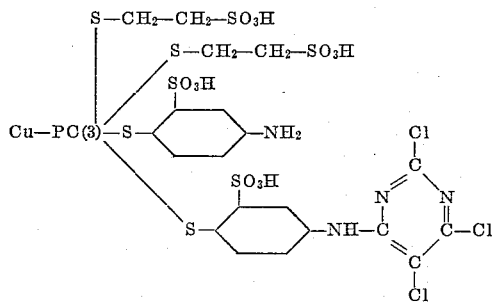

Example 1 (last paragraph):

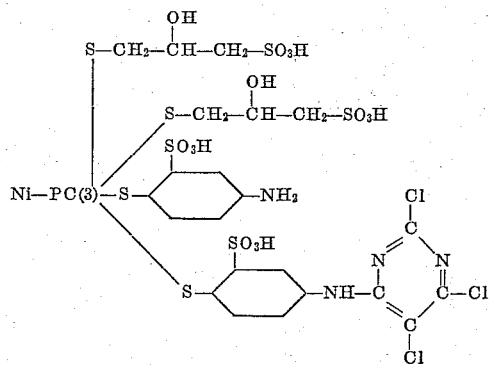

Ni—PC denotes the nickel phthalocyanine radical.
Example 2:

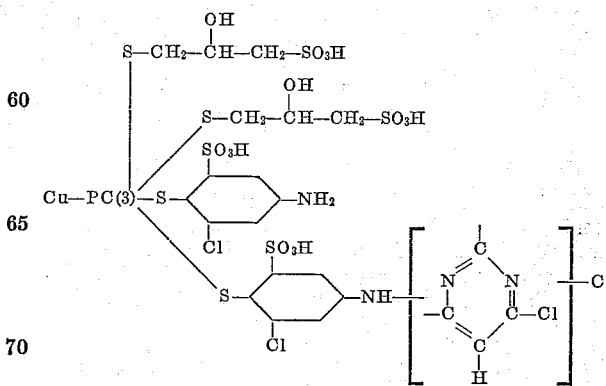

mixture of the 2,6-dichloropyrimidyl-4-dyestuff and 4,6-dichloropyrimidyl-2-dyestuff.

Example 3:

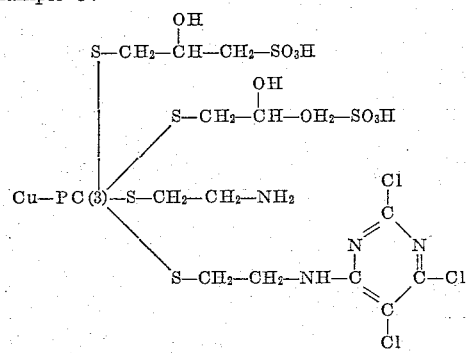

Example 4:

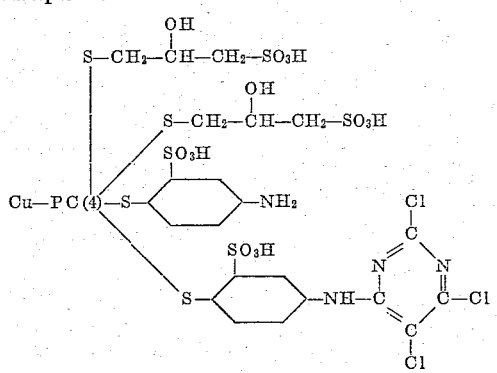

(4) denotes that the four —S— are bound to the copper phthalocyanine radical in the four 4-positions.

Example 5:

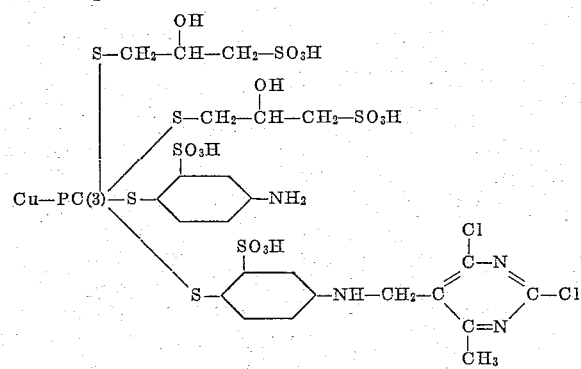

Example 32:

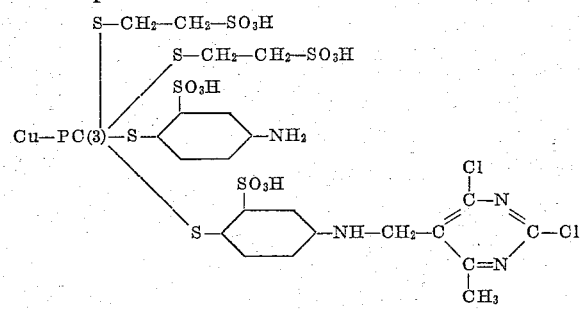

On condensing 2,4,5-trichloro- or 2,4,5-tribromopyrimidine or their derivatives with an amino dye, a mixture of the 2,5-dichloro- or 2,5-dibromo-pyrimidyl-4-amino dye and of the 4,5-dichloro- or 4,5-dibromopyrimidyl-2-amino dye is very probably obtained.

The derivatives of 2,4,6-trichloro- or 2,4,6-tribromopyrimidine bearing in the 5-position a substituent other than halogen give mixtures similar to those produced with 2,4,6-trichloro- or 2,4,6-tribromopyrimidine (cf. formula of Example 2), whereas 2,4,6-trichloro-5-chloromethyl-pyrimidine and 2,4,6-tribromo-5-bromomethyl-pyrimidine react in the same manner as 2,4-dichloro-5-chloromethylpyrimidine and 2,4-di-chloro-5-chloromethyl-6-methylpyrimidine (cf. formula of Examples 5 and 32).

Having thus disclosed the invention what I claim is:

1. Dyes of the formula

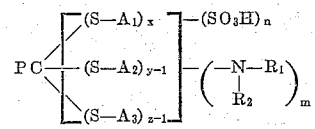

wherein
PC is the radical of a member selected from the group consisting of an unsubstituted metalfree phthalocyanine, an unsubstituted metal-containing phthalocyanine, a metal-containing phthalocyanine bearing one to 2 chlorine atoms and a metal-containing phthalocyanine bearing one to 2 bromine atoms, metal having an atomic number from 28 and 29, $A_1$ is a member selected from the group consisting of low molecular alkylene and low molecular hydroxyalkylene, each of $A_2$ and $A_3$ is a member selected from the group consisting of phenylene, chlorophenylene, nitrophenylene, aminophenylene, low molecular alkylene and low molecular hydroxyalkylene, $R_1$ is a member selected from the group consisting of dihalogenopyrimidyl and trihalogenopyrimidyl, halogen having an atomic weight between 35 and 81, $R_2$ is a member selected from the group consisting of hydrogen and low molecular alkyl, $n$ possesses a value of at least 2 but not more than 4 in the absence of phenylene radicals and at least 3 but not more than 4 in the presence of a phenylene radical and $m$, $x$, $y$ and $z$ each possesses a value of at least 1 but not more than 4, the total $x+y+z$ being 6 and the —$SO_3H$ and

groups being attached to the radicals $A_1$, $A_2$ and $A_3$.

2. The dye of the formula

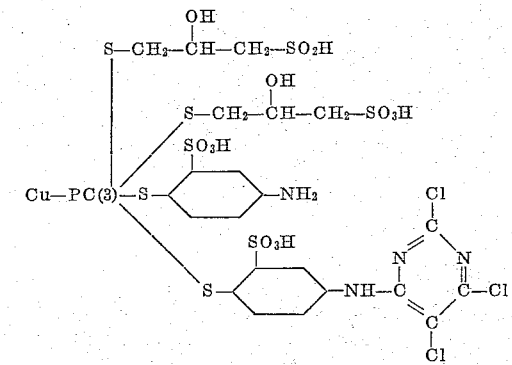

3. The dye of the formula

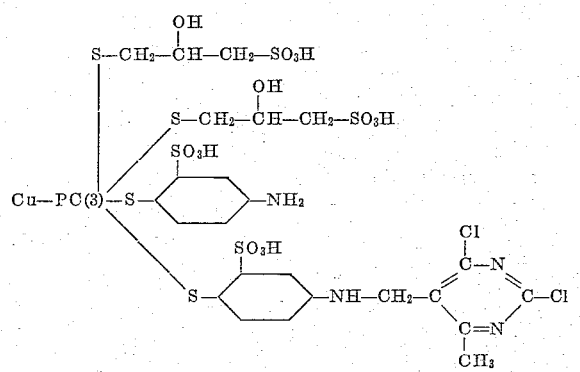

4. The dye of the formula
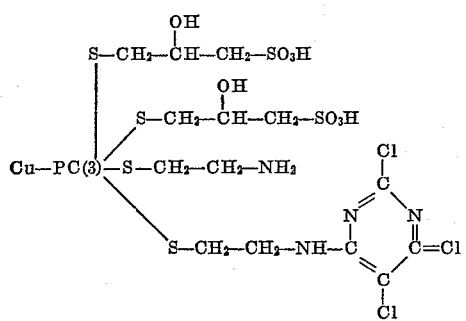
5. The dye of the formula
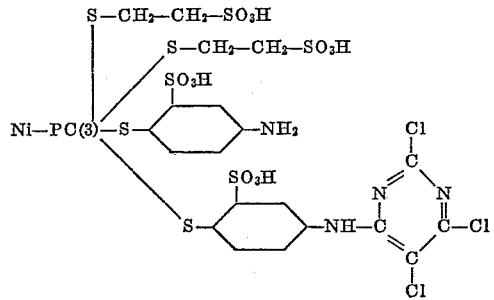
6. The dye of the formula
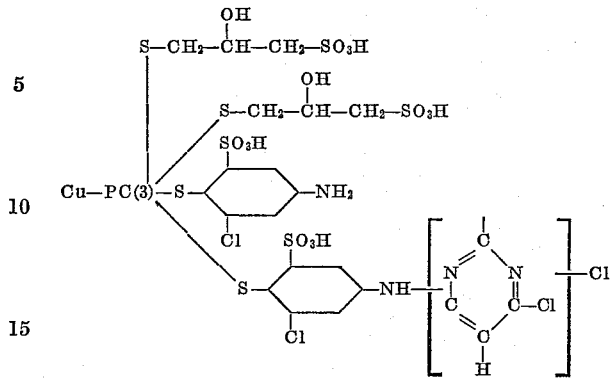
7. The dye of the formula
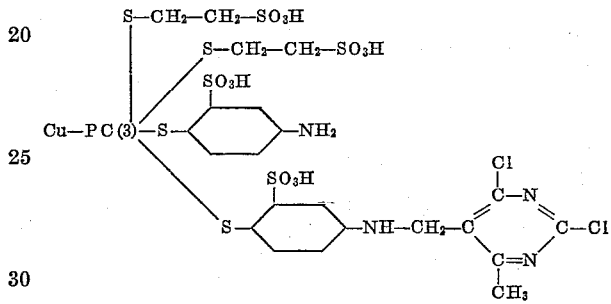
References Cited in the file of this patent
FOREIGN PATENTS
805,562    Great Britain _____ Dec. 10, 1958